United States Patent [19]

Marker et al.

[11] Patent Number: 4,635,579
[45] Date of Patent: Jan. 13, 1987

[54] BOOM END PIECE

[75] Inventors: Hannes Marker, Garmisch-Partenkirchen; Günter Rochelt, Munich, both of Fed. Rep. of Germany

[73] Assignee: Hannes Marker, Garmisch-Partenkirchen, Fed. Rep. of Germany

[21] Appl. No.: 692,499

[22] Filed: Jan. 18, 1985

[30] Foreign Application Priority Data

Jan. 19, 1984 [DE] Fed. Rep. of Germany ... 8401467[U]

[51] Int. Cl.[4] .......................... B63H 9/10; B63B 35/82
[52] U.S. Cl. ........................................ 114/97; 114/39; 403/295; 403/403
[58] Field of Search .......................... 114/97, 98, 39.2; 403/295, 292, 205, 403, 13, 14

[56] References Cited

U.S. PATENT DOCUMENTS

| | | | |
|---|---|---|---|
| 1,885,204 | 11/1932 | Johnson | 403/292 X |
| 1,960,405 | 5/1934 | Amor | 403/292 |
| 2,473,217 | 6/1949 | Peoples | 403/205 |
| 3,932,048 | 1/1976 | DuPont | 403/295 |
| 4,562,787 | 1/1986 | Adamek et al. | 114/97 |

FOREIGN PATENT DOCUMENTS

| | | | |
|---|---|---|---|
| 3125806 | 1/1983 | Fed. Rep. of Germany | 114/39.2 |
| 3206654 | 9/1983 | Fed. Rep. of Germany | 114/39.2 |
| 3239261 | 4/1984 | Fed. Rep. of Germany | 403/205 |
| 8300313 | 2/1983 | Switzerland | 114/97 |

*Primary Examiner*—Sherman D. Basinger
*Assistant Examiner*—Paul E. Salmon
*Attorney, Agent, or Firm*—Fleit, Jacobson, Cohn & Price

[57] ABSTRACT

This invention relates to a boom end piece, which has at least approximately the shape of a U or V and is adapted to be connected by a plug joint to two tubular spars of a boom of a sailboard rig. The two leg ends of the end piece consist of pegs and the end piece consists of two one-half sections, which are rigidly connected to each other and each of which comprises two half-pegs.

11 Claims, 4 Drawing Figures

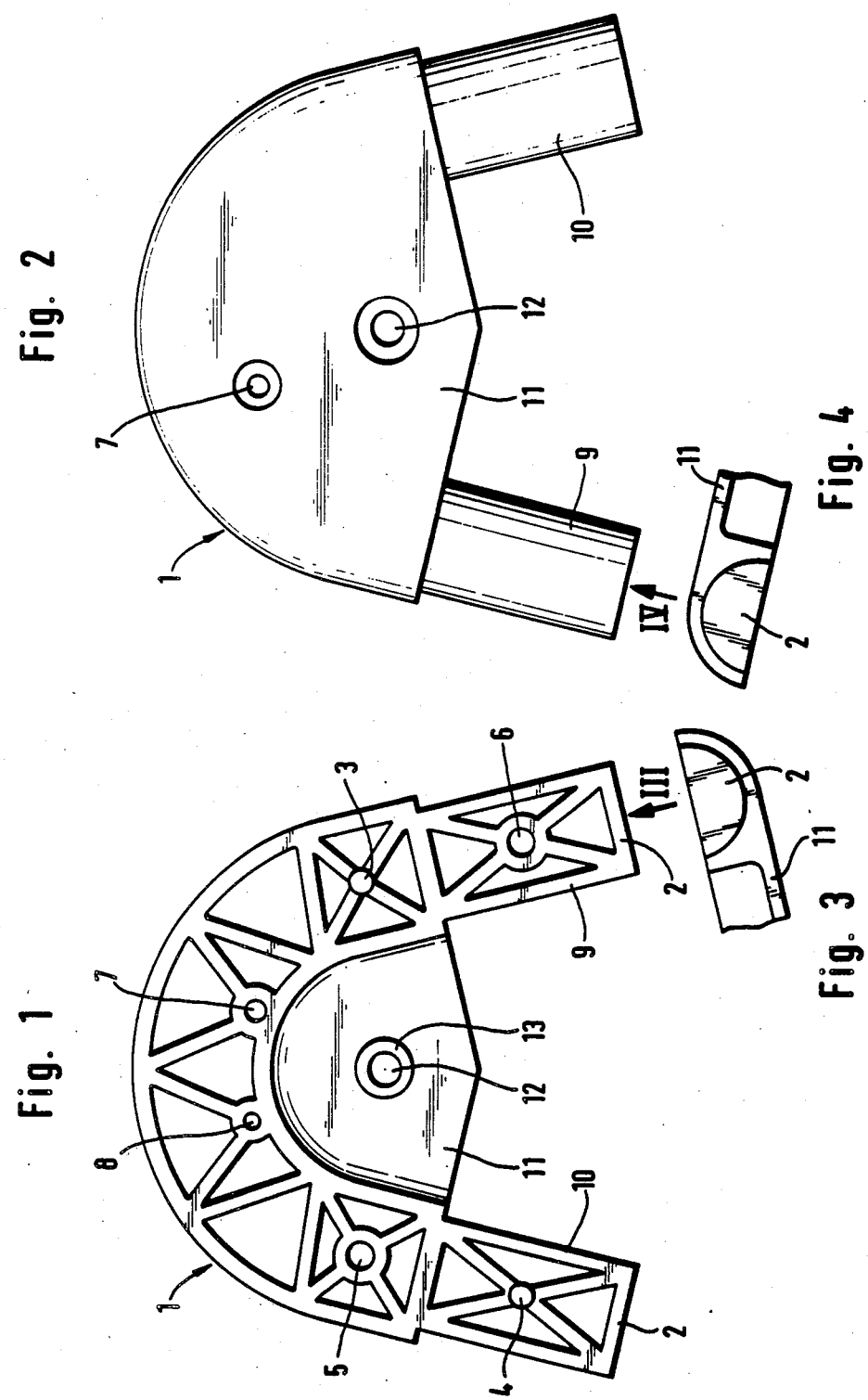

BOOM END PIECE

BACKGROUND OF THE INVENTION

1. Field of the Invention

This invention relates to a boom end piece, which has at least approximately the shape of a U or V and is adapted to be connected by a plug joint to two tubular spars of a boom of a sailboard rig.

2. Description of the Prior Art

The known end pieces provided at the fore and aft ends of the boom are provided with sockets, sleeves or recesses for receiving one end of each spar. For this reason and in order to ensure an adequate strength the known boom end pieces are rather bulky. These large overall dimensions and the resulting heavy weight and expenditure of material and high cost are undesirable.

SUMMARY OF THE INVENTION

It is an object of the invention to provide an improved end piece which can be designed to be light in weight so that it can be manufactured at low cost and without a need for large and expensive tools.

This object is accomplished in accordance with the invention in that the two leg ends of the end piece consist of pegs and the end piece consists of two one-half sections, which are rigidly connected to each other and each of which comprises two half-pegs.

The two one-half sections suitably consist of monocoques or semimonocoques so that they require only a small expenditure of material. Each semimonocoque may be provided with at least one stiffening rib so that the wall thicknesses may be very small.

A quick and reliable assembling of the one-half sections will be facilitated if each one-half section has at least one centering pin, which is directed toward the other one-half section, and a centering hole at a location which is symmetrical to the centering pin with respect to a plane of symmetry.

To permit the one-half sections to be firmly connected in a simple manner, each one-half section may have a screw-receiving hole having an axis which extends at right angles to the interfacial plane between the one-half sections, and a tapped hole at a location which is symmetrical to the screw-receiving hole with respect to the plane of symmetry.

In an end piece intended to connect the aft ends of the spars, it has been found that it is suitable to provide each one-half section on that side which is opposite to the interfacial plane between the one-half sections with a web plate, which connects the legs adjacent to the pegs, and said two plates define a pocket, which is adapted to accommodate a trimming sheet. In such an arrangement each web plate suitably carries a pivot pin, which is parallel to the centering pin, or an element adapted to receive such pivot pin. In that case the pivot pin or two coaxial stubs can be used in known manner to rotatably mount a roller for holding and deflecting the trimming sheet.

BRIEF DESCRIPTION OF THE DRAWING

FIG. 1 is an internal view showing one one-half section.

FIG. 2 is an external view showing that one-half section.

FIG. 3 is a fragmentary elevation showing the structure of FIG. 1 viewed in the direction of the arrow III.

FIG. 4 is a corresponding fragmentary elevation of the structure shown in FIG. 2, viewed in the direction of the arrow IV.

DETAILED DESCRIPTION OF THE PREFERRED EMBODIMENT

An illustrative embodiment of the invention will now be described more in detail with reference to the accompanying drawing.

In the embodiment shown by way of example the one-half section 1 of a boom end piece is approximately U-shaped and has in cross-section the configuration of one-half of a circular ring. It is closed at its ends by semicircular end walls 2. A number of stiffening ribs are provided to ensure that the one-half section will have an adequate strength although its wall thickness is as small as possible.

In the embodiment shown in FIG. 1 the one-half section 1 comprises centering pins 3, 4, which protrude from the paper plane, and is formed with two centering holes 5, 6, which are symmetrical to the centering pins 3, 4 with respect to a plane of symmetry. A screw-receiving hole 7 and a tapped hole 8 are provided on opposite sides of the plane of symmetry.

On that side which is opposite to the interface, the one-half section 1 is provided with a web plate 11 adjacent to the half-pegs 9 and 10. The web plate 11 is formed with a hole 12, which is surrounded by a stiffening rim 13.

Two of the one-half sections 1 which are shown can be connected to form a boom end piece in that the centering pin of each one-half section is inserted into the centering hole of the other one-half section and a screw is inserted through the screw-receiving hole 7 of each one-half section and screwed into the tapped hole 8 of the other one-half section so that the two one-half sections are reliably held together. The holes 12 in the web plate 11 may receive, e.g., a rivet for rotatably mounting a pulley for deflecting a trimming sheet.

A fore end piece for a boom may consist of one-half sections which are similar to those of the rear end piece for the boom. In that case the web plates should be concave to conform to the mast and, e.g., the hole 12 may be designed to receive a rope to be connected to the mast.

What is claimed is:

1. A boom end piece for a sailboard rig, said boom end piece comprising:
    two identical monocoque one-half sections of a body, each one-half section having at least approximately the shape of a U or a V, each of said two one-half sections including integral components of two legs, two leg ends, and alignment means for aligning said two one-half sections with each other so that said two leg ends of one one-half section form together with said two leg ends of the other one-half section two pegs for connecting two tubular spars of a boom of a sailboard rig to said boom end piece by a plug joint, said two pegs having a diameter substantially equal to an inner diameter of said tubular spars.

2. A boom end piece according to claim 1, wherein said monocoque one-half sections are provided with stiffening ribs.

3. A boom end piece according to claim 1, wherein said alignment means includes on each one-half section, at least one centering pin directed toward the other one-half section, and a centering hole at a location symmetrical to the centering pin with respect to a plane of symmetry.

4. A boom end piece according to claim 1, wherein each one-half section has a screw-receiving hole having an axis which extends at right angles to the interfacial plane between the one-half sections, and a tapped hole at a location which is symmetrical to the screw-receiving hole with respect to the plane of symmetry.

5. A boom end piece according to claim 1, wherein each one-half section has on that side which is opposite to the interfacial plane between the one-half sections a web plate, which connects the legs adjacent to the pegs, and said two plates define a pocket for receiving a trimming sheet.

6. A boom end piece according to claim 5, wherein each web plate is provided with means for receiving a pivot pin.

7. A boom end piece as in claim 6, wherein the shape of the two one-half sections is a U.

8. A boom end piece for a sailboard rig, said boom end piece comprising:
two one-half sections of a body, each one-half section having the shape of a U or a V and being a monocoque,
each of said two one-half sections including two legs and two leg ends,
centering means defined by each one-half section for aligning each of said two one-half sections with respect to each other so that said two leg ends of one-half section together with said two leg ends of the other one-half section form two pegs for connecting two tubular spars of a boom of a sailboard rig to said boom end piece by a plug joint,
said centering means extending from one of said two one-half sections and being recessed into the other of said two one-half sections,
said two pegs having a diameter substantially equal to an inner diameter of said two tubular spars, and
a web plate connecting the two legs of each one-half section to form a pocket between said two one-half sections for receiving a trimming sheet when said two one-half sections are aligned by said centering means.

9. A boom end piece as in claim 8, wherein each of said two one-half sections include stiffening ribs.

10. A boom end piece as in claim 8, wherein each one-half section further comprises a screw-receiving hole having an axis extending normal to an interfacial plane located between said two one-half sections, and a tapped hole at a location symmetrical to said screw-receiving hole with respect to a plane of symmetry of each one-half section.

11. A boom end piece as in claim 8, wherein each web plate includes means for receiving a pivot pin.

* * * * *